United States Patent [19]
Koivu

[11] Patent Number: 5,375,119
[45] Date of Patent: Dec. 20, 1994

[54] METHOD FOR HANDLING DATA TRANSMISSION FRAMES OF VARIABLE LENGTH WITH A CHANNEL CONTROLLER AND FOR WRITING THEM TO A CYCLIC BUFFER MEMORY

[75] Inventor: Vesa Koivu, Oulu, Finland

[73] Assignee: Nokia Telecommunications OY, Espoo, Finland

[21] Appl. No.: 78,279

[22] PCT Filed: Oct. 29, 1992

[86] PCT No.: PCT/FI92/00292
§ 371 Date: Jun. 22, 1993
§ 102(e) Date: Jun. 22, 1993

[87] PCT Pub. No.: WO93/09623
PCT Pub. Date: May 13, 1993

[30] Foreign Application Priority Data
Oct. 30, 1991 [FI] Finland ................... 915123

[51] Int. Cl.$^5$ ............................................. H04L 12/66
[52] U.S. Cl. ..................................... 370/82; 370/85.13
[58] Field of Search ............... 370/79, 82, 85.13, 94.2, 370/99, 105.1, 108; 375/110

[56] References Cited
U.S. PATENT DOCUMENTS 4,410,889 10/1983 Bryant et al. .................... 370/82
5,001,708 3/1991 Williams et al. ............... 370/105.1

FOREIGN PATENT DOCUMENTS
339797 11/1989 European Pat. Off. .
430051 6/1991 European Pat. Off. .

*Primary Examiner*—Benedict V. Safourek
*Attorney, Agent, or Firm*—Cushman Darby & Cushman

[57] ABSTRACT

A method for handling data transmission frames of variable length in the interface between two networks, and for writing them into a cyclic buffer memory (3) wherein the data transmission frames are made of a header field (H) containing at least control data, a data field (D) and an end field of variable length. To obtain flexible buffering, the buffer memory (3) is divided into more than one logical section, each having a header field and a data field. The indicated real length of an incoming frame is taken into account: in the buffer memory operations in such a manner that the channel decoder (4) is interrupted for each frame section which have come from the channel to the area of the buffer, whereby the channel decoder reads the frame sections to its own memory, whereby the last interrupt related to the frame is made on the basis of the indicated real length of the frame when the last section of said frame is in the buffer.

2 Claims, 2 Drawing Sheets

METHOD FOR HANDLING DATA TRANSMISSION FRAMES OF VARIABLE LENGTH WITH A CHANNEL CONTROLLER AND FOR WRITING THEM TO A CYCLIC BUFFER MEMORY

BACKGROUND OF THE INVENTION

The present invention pertains to a method for handling data transmission frames of variable length with a channel controller and for writing them to a cyclic buffer memory wherein the data transmission frames consist of a header field containing at least control data, a data field and an end field of variable length.

In the interface between the PCM and GSM networks, communication takes place by using TRAU frames which are defined in the GSM specifications and which possess the following properties:
- recurrence interval 20 ms
- contains data relating to one traffic communication (voice/data channel)
- reserves one PCM time slot
- transparent to the PCM channel
- contain 320 bits of control information and data.

In order for the channel decoder receiving the TRAU frames to be capable of operating in compliance with the GSM specifications, the frames must arrive at the channel decoder correctly phased. Owing to time slips of clocks, maintenance of the correct phasing requires that the TRAU frame be shortenable or extendable by four bits, i.e. the length of the TRAU frames be in fact 320±4 bits. The channel decoder is informed of whether the TRAU frame concerned has been extended or shortened by control bits located at the very beginning of the frame.

The situation described above is problematic, because TRAU frames may nave a length varying four bits in both directions while the length of the buffer section is invariable. Several extended or shortened TRAU frames then cause the frame to slip within the buffer section, whereby the controller interrupts the channel decoder at the wrong time, either too late (TRAU frame shortened) or too early (TRAU frame extended), i.e. when the buffer section is full. The only right moment for interrupt would be when the buffer has a complete TRAU frame. For instance, in a GSM base station slip causes unnecessary delay in the speech signal.

SUMMARY OF THE INVENTION

The present invention provides a solution to problems in the interface between the PCM and GSM networks caused by non-ideal behaviour of the clocks controlling said networks. To achieve this, the method of the invention is characterised in that the buffer memory is divided into more than one logical section, each section comprising a header field and a data field, and that at least the following steps are performed by means of the channel controller and a channel decoder in respect of an incoming frame:
- reading an amount of information corresponding to the length of one buffer section by means of the channel controller from the beginning of the frame,
- writing the frame section which has been read to one section of the buffer memory, and interrupting the channel decoder, whereby the channel decoder reads the frame section from the buffer memory to its own storage space,
- recognising the real length of the frame indicated in the header field of the frame by means of the channel decoder,
- writing the required length, calculated using the indication of the length of the frame, by the channel decoder to the header field of a second buffer section,
- writing the frame section coming from the channel in a corresponding manner by the channel controller to an area of the buffer, and interrupting the channel encoder correspondingly, whereby the channel decoder reads the frame sections to its own memory,
- making the last interrupt related to the frame on the basis of the indicated real length of the frame when the last section of the frame is in the buffer.

The last interrupt related to the frame occurs, due to the extension/shortening of one buffer section, exactly when a complete frame is in the buffer. The buffer memory is preferably divided into two sections, each having a header and a data field.

In this way, a buffer of 'flexible' length is realised, whereby slip of the TRAU frame within the buffer is avoided, and the channel encoder is interrupted at the correct moment. In the services provided by the GSM network, this can be noticed as elimination of speech delays caused by slip of the frame.

BRIEF DESCRIPTION OF THE DRAWINGS

In the following, the invention will be described in more detail by means of an example with reference to the attached drawings, wherein FIG. 1 schematically shows a TRAU frame.

DETAILED DESCRIPTION

Figure 1:
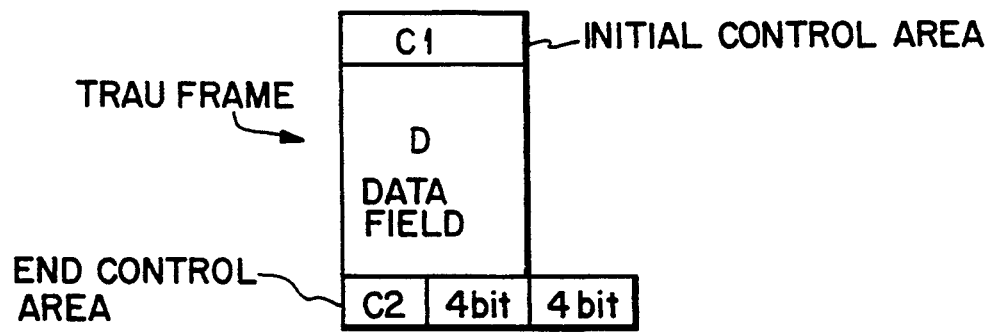

FIG. 1 schematically shows a TRAU frame. It comprises initial and end control areas C1 and C2, a data area D, and the total length thereof may vary ±4 bits, which is indicated by two blocks provided with the text '4 bit'.

Figure 2:
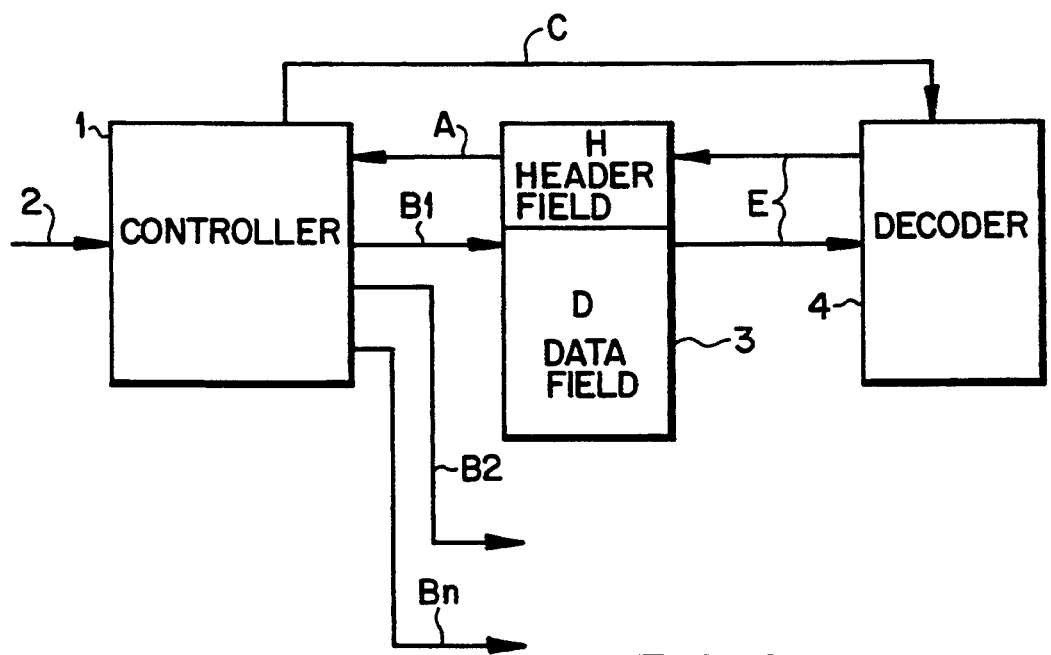
FIG. 2 illustrates handling of TRAU frames in the interface between the networks.

The actual communication takes place as illustrated by FIG. 2. A controller 1 takes care of picking up TRAU frames belonging to the traffic communication from a PCM channel 2. The controller 1 reads first (arrow A) its own control data from the header field of a buffer 3, writes (arrows B1 ... Bn) a TRAU frame to the buffer i.e. DP-RAM. There may be 16 buffer memories 3 connected to the same controller, as indicated by arrows B1-Bn. After this the controller 1 interrupts (arrow C) a DSP processor i.e. a channel decoder 4, which reads (arrows E) the TRAU frame to its own memory.

The memory area of the buffer 3 is divided into two sections: a header field H, which assists the controller in writing to memory, and an actual data area D, to which the TRAU frame is written. The header field H, formatted by the channel decoder 4, comprises, e.g., an indication of the length of the data area, which the controller always reads before starting to write the TRAU frame to the data area, as indicated above. Having filled the data area D, the controller 1 interrupts the channel decoder 4 according to the prior art, which, owing to a TRAU frame of variable length, may arrive at the wrong time, as described above.

The controller used, such as a Rockwell 8071 controller, is characterised in that the buffer section used has a length which can be dynamically regulated.

Figure 3A:
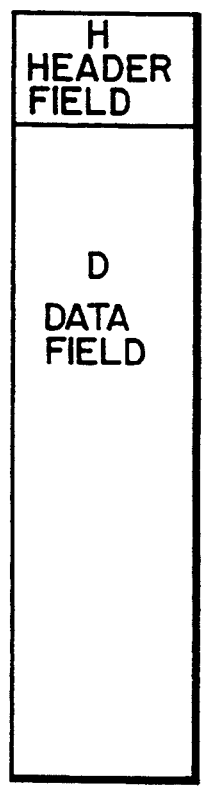
FIGS. 3a and 3b show buffer memory areas arranged according to the prior art and according to the invention.
Figure 3B:
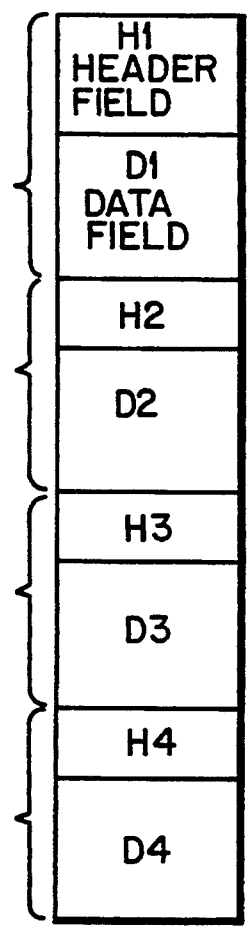

FIG. 3a illustrates the memory area of the buffer 3 arranged according to the prior art and comprising a header field H and a data area D of fixed length. FIG. 3b illustrates the memory area of the buffer 3 arranged in accordance with the invention and wherein the header field H and data area D are divided into two sections H1 and H2, and D1 and D2, respectively. The overall length of the two data areas is half of the normal length of a TRAU frame. In this case data contained in one TRAU frame is thus written to the buffer sections e.g. in four different stages I-IV for instance such that in stages I and III data is written to the first buffer section and in stages II and IV to the second buffer section. The beginning of a TRAU frame may be phased to the beginning of either one of the buffer sections.

In the example of a buffer divided into two sections, the following steps are carried out according to the invention in respect of an incoming frame by means of the channel controller 1 and channel decoder 4:

- an amount of data corresponding to the length of one frame is read by the channel controller from the first section of the frame,
- the section of the frame which has been read is written to a section D1 of the buffer memory, and the channel decoder is interrupted, whereby the channel decoder reads the frame section from the buffer memory to its own storage space,
- the real length of the frame indicated in the header field of the frame is recognised by the channel decoder;
- the required length calculated using the indication of the length of the frame is written by the channel decoder to the header field H2 of the second buffer section,
- the section of the frame which has come from the channel to the area D2 of the buffer is written by the channel controller in a corresponding manner, and the channel controller is correspondingly interrupted, whereby the channel decoder reads the frame sections to its own memory,
- whereby the last interrupt relating to said frame is made on the basis of the indicated real length of the frame when the last quarter of the frame is in the buffer.

In such a case the last interrupt relating to said frame occurs, due to the extension/shortening of one buffer section, exactly when a complete frame is in the buffer. In other words, as the channel decoder makes an interrupt after each filled buffer section, one of these interrupts occurs when the entire frame is ready in the buffer sections.

After receiving the first interrupt, the channel decoder 4 has 10 ms time to read the first quarter of the TRAU frame to its own memory, interpret, e.g., the indication of the length of the TRAU frame from the control bits contained therein, and modify the length indication of the buffer in the header information of the second buffer section accordingly before the controller 1 writes the second part of the TRAU frame.

When the data areas (D1-D2)*2 correspond to the real length of the entire TRAU frame, the last interrupt relating to the TRAU indicates that even the last data contained in the frame is ready in the buffer 3.

It is obvious for a person skilled in the art that the different embodiments of the invention are not limited by the example described above but may vary within the scope of the attached claims.

I claim:

1. A method for handling data transmission frames of variable length in an interface between two networks, wherein each data transmission frame is constituted by a header field containing control data including the length of the respective frame, a fixed-length data field containing data, and an end field of variable length, comprising:

(a) functionally providing between the two networks a controller, which is operatively associated with at least one buffer, each said buffer being operatively associated with a decoder, the controller being arranged to receive frames successively from one said network, and the decoder being arranged to send data from respective of said frames successively into the other said network, said buffer being divided into at least two logical sections, each having a header field and a data field;

(b) beginning to receive a frame from the one network by the controller;

(c) writing by said controller to respective fields of a first said section of said buffer the header of said frame, and a beginning part of the data field of said frame corresponding in length to the data field of the first section of said buffer;

(d) upon concluding step (b), interrupting said decoder by said controller and thereby causing said decoder to read said first section of said buffer into respective storage space of said decoder;

(e) recognizing by said decoder from said header read thereto from said first section of said buffer the real length of the frame;

(f) calculating from the real length of the frame, the size of the data field of a next said logical section of said buffer and the size of the data field read by the decoder as a result of step (d), a next header which includes information as to how much more as an increment of said frame is to be written in a next buffer section writing step by said controller to said data field of said next logical section of said buffer, and writing said next header to said header field of said next logical section of said buffer;

(g) reading by said controller from said header field of said next section of said buffer how much more of said frame to write to said data field of said next logical section of said buffer in said next buffer section writing step;

(h) writing by said controller to respective fields of the next section of said buffer the increment of said frame calculated in step (f);

(i) upon concluding step (h), interrupting said decoder by said controller and thereby causing said decoder to read said next section of said buffer into respective storage space of said decoder;

(j) if said buffer has more than two said sections and the increment written in step (h) did not conclude said frame, repeating steps (e) through (i) until all of said frame has been written into respective storage space of said decoder; and (k) sending data corresponding to that written into said storage space of said decoder as a result of conducting steps (d), (i) and (j), by said decoder to other network.

2. The method of claim 1, wherein:

said one network is a PCM network and said other network is a GSM network, and said frames are TRAU frames having a length of 320 bits±4 bits.

* * * * *